United States Patent
Kitaoka

[11] Patent Number: 6,110,441
[45] Date of Patent: Aug. 29, 2000

[54] METAL OXIDE FIBER, AND PRODUCTION METHOD THEREOF

[75] Inventor: Kenji Kitaoka, Kawanishi, Japan

[73] Assignee: Minolta Co., Ltd., Japan

[21] Appl. No.: 09/076,626

[22] Filed: May 12, 1998

[30] Foreign Application Priority Data

May 12, 1997 [JP] Japan ..................................... 9-121116

[51] Int. Cl.[7] .................................................. C01G 49/00
[52] U.S. Cl. ........................... 423/593; 423/594; 423/595; 423/596; 423/598; 423/599; 423/600; 501/11; 501/35; 501/38; 501/95
[58] Field of Search ..................................... 423/593, 594, 423/595, 596, 598, 599, 600, 605, 606, 608; 501/95, 11, 35, 38

[56] References Cited

U.S. PATENT DOCUMENTS

| | | | |
|---|---|---|---|
| 3,663,182 | 5/1972 | Hamling | 23/355 |
| 3,846,527 | 11/1974 | Winter et al. | 264/63 |
| 3,875,296 | 4/1975 | Brubaker | 423/592 |
| 4,588,575 | 5/1986 | David | 423/594 |
| 4,757,036 | 7/1988 | Kaar | 501/95 |
| 4,978,515 | 12/1990 | Johnson | 423/263 |
| 5,004,711 | 4/1991 | Grodek | 501/103 |
| 5,037,579 | 8/1991 | Matchett | 252/313.1 |
| 5,139,980 | 8/1992 | Nakahara et al. | 502/8 |
| 5,227,365 | 7/1993 | Van Den Sype | 505/1 |
| 5,330,833 | 7/1994 | Yamashita et al. | 428/364 |
| 5,372,620 | 12/1994 | Rowse et al. | 51/309 |
| 5,604,057 | 2/1997 | Nazri | 429/224 |

OTHER PUBLICATIONS

*Fabrication and Characterization of Ferroelectric PLZT 7/65/35 Ceramic Thin Films and Fibers*, by Seth, et al., Ferroelectrics, 1990, vol. 112, pp. 283–307.

Primary Examiner—Tom Dunn
Assistant Examiner—Cam N. Nguyen
Attorney, Agent, or Firm—Morrison & Foerster

[57] ABSTRACT

A method of producing a homogeneous metal oxide fiber having high denseness and free of voids that may adversely affect the electro-optic characteristic of the fiber, and a metal oxide fiber produced according to the method. The method comprises:

a first step of forming a gel-form fiber from a sol obtained by concentrating a solution composed of a metallic compound, water and a solvent to the extent that the solution exhibits a spinnable behavior;

a second step of decomposing and eliminating organic components out of the gel-form fiber obtained at the first step; and a third step of solidifying the gel-form fiber obtained at the second step;

the second step and/or the third step being carried out while heating is made in a water vapor atmosphere.

16 Claims, 2 Drawing Sheets

FIG. 1
FIG. 2
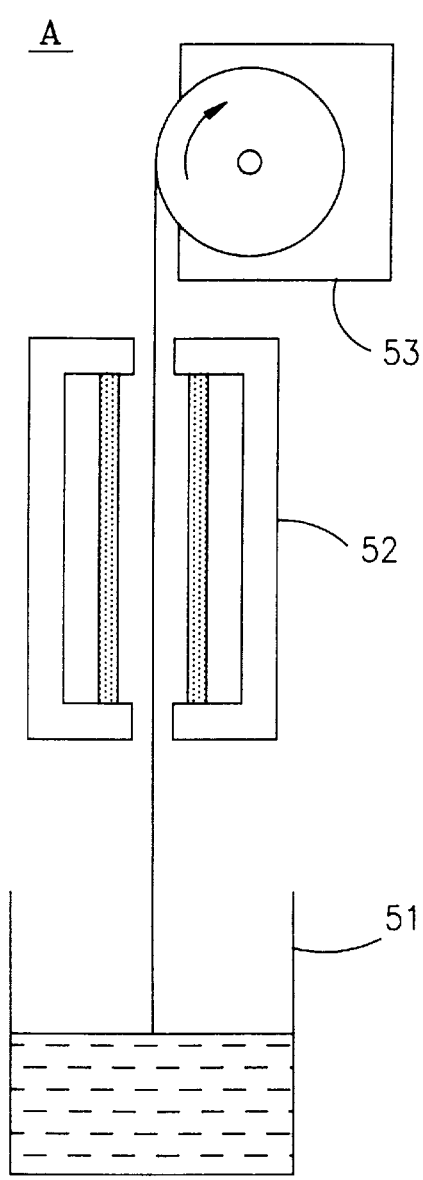
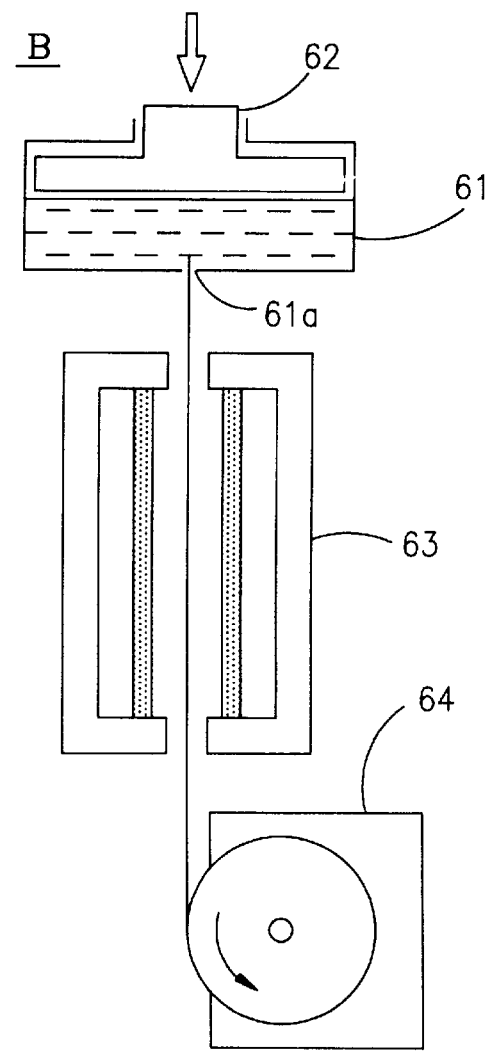

METAL OXIDE FIBER, AND PRODUCTION METHOD THEREOF

This application is based on application(s) Ser. No. Hei09-12116 filed on May 12, 1997 in Japan, the content of which is hereby incorporated by reference.

BACKGROUND OF THE INVENTION

1. Field of the Invention

The present invention relates to a method of producing a metal oxide fiber and, more particularly, to a method of producing a metal oxide fiber employing a sol/gel process, and metal oxide fibers produced according to the method.

2. Description of the Prior Art

Conventionally, attempts have been made to apply a metal oxide material to functional devices by utilizing various characteristics of the metal oxide material. For example, it has been known that (Pb, La) (Zr, Ti)$O_3$ (hereinafter referred to as PLZT) has a perovskite crystal structure and exhibits high secondary electro-optic effect (Kerr effect), which makes it possible to use the metal oxide material in various applications such as optical shutter, optical modulator, and ferroelectric memory. Also, it has been known that Pb(Zr, Ti)$O_3$ (hereinafter referred to as PZT) has a perovskite crystal structure and exhibits high piezoelectric effect, which makes it possible to use the material in such an application as actuator.

If such a metal oxide could be formed into a fiber form, the range of applications of the metal oxide would be broadened, and this would make it possible to develop a novel device. For example, by arranging PLZT fibers in array it is possible to provide an optical shutter device capable of processing plural beams in parallel.

A method of producing a metal oxide fiber is reported in, for example, a journal "FERROELECTRONICS", 1990, Vol. 1112, pp 283–307, in which a report on the production of a PLZT fiber by sol/gel process. The term "sol/gel process" used herein means a method of producing a glass phase metal-oxide material or sintered metal oxide material which includes the steps of preparing an organic or inorganic metal compound in the form of solution, effecting the hydrolysis and polymerization reaction of the compound in the solution thereby to form a particulate-containing sol, converting the sol into a gel which contains a liquid or gas present in interstices within a solid-phase skeletal structure, then heating the gel.

According to the technique described in the report, lead acetate hydrate, lanthanum acetate hydrate, zirconium n-propoxide and titanium n-propoxide are used as starting materials and, after a solution in which the materials are uniformly dissolved is obtained, an acid catalyst is sued to effect hydrolysis and polymerization, the resulting solution being concentrated to give a high-viscosity sol having a spinnable characteristic. The report says that a gel fiber of PLZT can be produced from the high-viscosity sol by forming the sol into fiber form.

In the above noted technique, however, the presence of the acid catalyst in the sol allows continued progress of hydrolysis and polymerization even after the sol exhibits a spinnable characteristic, and this poses a problem that the useful life of the solution is shortened.

Another problem is that an organic matter residue is present in the interior of the fiber, so that the organic matter is vaporized in the heat treating stage, which results in the formation of voids having an air gap of about 100angstroms or more which can hardly be removed even when heat treatment is carried out at a high temperature for a long time period. The presence of such voids in the material poses a further problem that the electro-optic characteristic and light transmittance of the material are lower than a normally expectable level when the fiber is in use.

SUMMARY OF THE INVENTION

It is an object of the invention to provide a method of producing a homogeneous metal oxide fiber having high denseness and free of voids that may adversely affect the electro-optic characteristic of the fiber.

It is another object of the invention to provide a metal oxide fiber produced according to the method.

The present invention relates to a method of producing a homogeneous metal oxide fiber having high denseness and free of voids that may adversely affect the electro-optic characteristic of the fiber, and a metal oxide fiber produced according to the methods. The method comprises:

a first step of forming a gel-form fiber from a sol obtained by concentrating a solution composed of a metallic compound, water and a solvent to the extent that the solution exhibits a spinnable behavior;

a second step of decomposing and eliminating organic components out of the gel-form fiber obtained at the first step; and a third step of solidifying the gel-form fiber obtained at the second step;

the second step and/or the third step being carried out while heating is made in a water vapor atmosphere.

BRIEF DESCRIPTION OF THE DRAWINGS

FIG. 1 is a schematic view showing by way of example the construction of a gel-form fiber forming apparatus;

FIG. 2 is a schematic view showing by way of example the construction of another type of gel-form fiber forming apparatus;

DETAILED DESCRIPTION OF THE INVENTION

Figure 3:
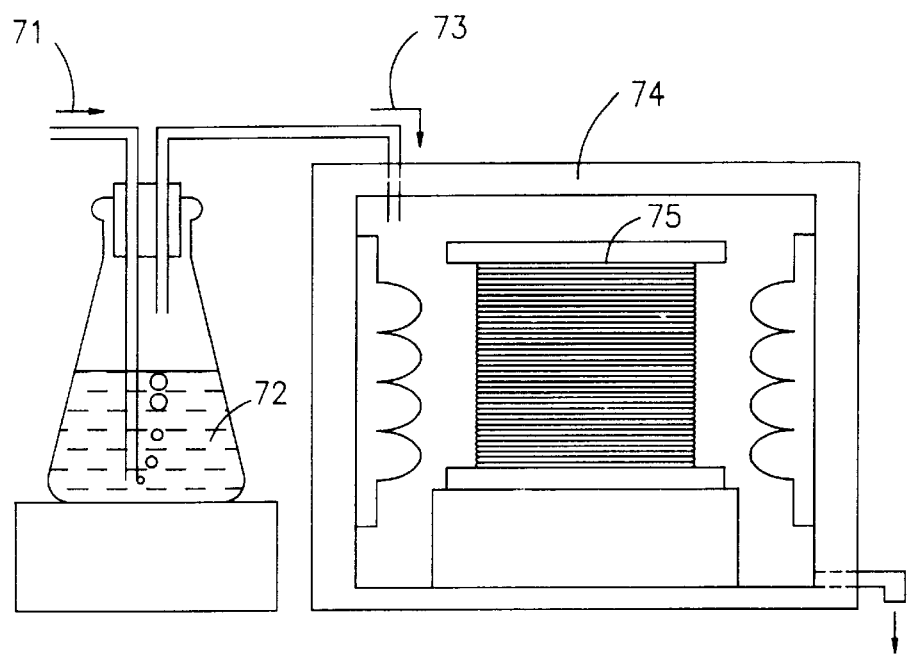
FIG. 3 is a schematic view showing an apparatus for heat-treating a gel-form fiber in a water-vapor atmosphere.

According to the present invention there is provided a method of producing a metal oxide fiber which comprises:

a first step of forming a gel-form fiber from a sol obtained by concentrating a solution containing a metallic compound, water and a solvent to the extent that the solution exhibits a spinnable behavior;

a second step of decomposing and eliminating organic components out of the gel-form fiber obtained at the first step; and a third step of solidifying the gel-form fiber obtained at the second step;

the second step and/or the third step being carried out while heating is made in a water vapor atmosphere.

The invention also provides a metal oxide fiber produced by the above mentioned method.

At the first step of the method of the invention, the metallic compound and water are mixed with the solvent to prepare a homogeneous solution. In this conjunction, the metallic compound as the starting material may be any metallic compound, whether organic or inorganic, as long as the compound is one from which can be formed an amorphous, polycrystalline, or ceramic fiber of a metal oxide expressed finally by the formula $ABO_3$. In the formula $ABO_3$, A denotes any of Li, Na, La, Gd, Ca, Sr, Ba, Pb, Bi, Y, Ce, Pr, Nd, Sm, Eu, Tb, Dy, Ho, Cd, and a mixture of such elements; and B denotes any of Sn, Ti, Zr, Hf, V, Nb, Mg, Ta, W, Mo, Mn, Sb, Cr, Ni, Fe, Zn, Sc, Si, Ge, Te, Al, Co, and a mixture of such elements.

The metallic compound may be a compound composed of an alkoxide, acetate or acetylacetonate compound of at least one of the A metals and an alkoxide, acetate or acetylacetonate compound of at least one of the B metals. Where the metallic compound is a metallic compound of a composition including at least one of the metals expressed by A and at least one of the metals expressed by B, a finally obtained metal oxide fiber is a material which exhibits higher refractive index and better electro-optic characteristic as compared with conventional optical fiber or silica glass.

Alkoxide, acetate, and acetylacetonate have a feature that they produce a metalloxane bond (M—O—M, wherein M denotes metal) by hydrolysis. Such a bond between compounds is a structure necessary for enabling a sol to exhibit a spinnable behavior.

When the metallic compounds, as a starting material, contains none of alkoxide, acetate, and acetylacetonate compounds, it is acceptable if such compounds can be synthesized by hydrolysis and/or polymerization reaction under specified conditions. For example, single-metal materials, chloride, nitrate, and the like could not form a metalloxane bond if they remain as such, but by causing them to chemically react under specified conditions it is possible to synthesize alkoxide, acetate and acetylacetonate.

In the present invention, preferred metallic compounds (of the $ABO_3$ type) are acetates and alkoxides of lead, lanthanum, zirconium and titanium for use in synthesizing (Pb, La)(Zr, Ti)$O_3$(PLZT), or more specifically lead acetotrihydrate, lanthanum isopropoxide, zirconium propoxide, titanium isopropoxide, and the like. Examples of preferred metallic compounds for use in synthesizing Pb(Zr, Ti)$O_3$ (PZT) are acetates and alkoxides of at least lead, zirconium, and titanium, or more specifically mixtures of lead acetotrihydrate, zirconium propoxide, and titanium isopropoxide. Preferred metallic compounds for use in synthesizing PbTiO$_3$ are acetates and alkoxides of at least lead and titanium, or more specifically mixtures of lead acetotrihydrate, titanium isopropoxide, and the like. Preferred metallic compounds for use in synthesizing LiNbO$_3$ are metals and alkoxides of at least lithium and niobium, or more specifically mixtures of metallic lithium, niobium ethoxide, and the like. A preferred metallic compound for use in synthesizing LiTaO$_3$ is an alkoxide of lithium and tantalum, or more specifically a mixture of metallic lithium and tantalum ethoxide. A preferred metallic compound for use in synthesizing Pb(Ni, Nb)$O_3$ is an alkoxide of at least lead, nickel and niobium, or more specifically a mixture of metallic lithium, niobium ethoxide, and the like. The mixing ratio of components for each respective metallic compound may be determined according to the molar ratio of metals contained in the metal oxide to be finally obtained.

Further, if an amorphous fiber is finally obtainable which is composed of such metal oxides (alkoxide, acetate, acetylacetonate, and the like) of elements selected from Ti, Pb, Bi, Te, Nb, La, Ta, V, W, Re, Sb, and Sn as are mixed in an arbitrary ratio, the present invention is also applicable with respect to any combination of metallic compounds from which such metal oxides can be obtained.

In the present invention, any solvent which is capable of homogeneously dissolving aforesaid metal oxides, i.e., alkoxide, acetate, and acetylacetonate, may be used. The solvent most suitable for use in relation to the metallic compound should be selected considering the characteristics of the solvent, such as boiling point, metallic material dissolving power, and stability. Usable as such a solvent may be, for example, a single alcohol or a mixture of two or more kinds of alcohol, or more specifically 2-methoxyethanol or a mixture of 2-methoxyethanol and ethanol.

Water for mixture with the solvent maybe introduced during the process of preparing the metal oxide fiber. Alternatively, water may be introduced from water of crystallization of metallic compound, water content of the alcohol in the solvent, atmospheric moisture, or a combination thereof. Water is required in producing aforesaid methalloxane bond. Where the required water is introduced from the water of metal crystallization, water content of the alcohol in the solvent, atmospheric moisture or the like, there is no necessity of introducing water in particular and the process for metal oxide fiber production can be simplified accordingly.

As described above, a homogeneous solution is prepared by mixing the metallic compounds, water and solvent together. In this conjunction, the total concentration of all the metallic compounds should be preferably such that the number of moles of the solvent is 5 to 10 times the number of moles of the metal of all the metallic materials. If the number of moles of the solvent is too small, the solubility of the metallic materials is lowered so that any homogeneous sol can hardly be obtained. If the number of moles is too large, it is necessary to remove a large quantity of solvent during the process of concentration, resulting in decreased productivity. Further, for purposes of developing a spinnable behavior of and stabilizing the post-concentration sol, it is desirable to adjust the concentration of the water so that the number of moles of the water is 0.3 to 3 times the number of moles of the meal of all the metallic materials.

Next, the solution obtained is concentrated to the extent that the solution exhibits a spinnable behavior, thereby to obtain a high-viscosity sol. The concentration of the solution may be carried out by any method and/or means such that the solvent can be evaporated. However, from the viewpoints of operating efficiency and reactivity of metallic ions in the sol in relation to the spinnable of the sol, it is desirable that the solution be concentrated until the solution exhibits a spinnable behavior at a temperature close to the boiling point of the solvent. The expression "spinnable behavior" or "spin characteristic" used herein means a characteristic such that when a high-viscosity solution, such as polymer solution or colloidal solution, is allowed to drop, or when a stick, dipped in such solution, is quickly pulled up, the liquid tends to behave sticky. The term "sol" herein is used in the sense that the sol is a solution in which a polymeric product and complex ions of submicron or lower order are uniformly dispersed.

In the production of metal oxide materials according to the conventional sol/gel process, an acidic catalyst, such as nitric acid, is added so as to enhance hydrolysis and polymerization. However, the addition of an acidic catalyst poses a problem that hydrolysis and polymerization progress with time, so that during the stage of fiber forming, reaction progresses with time even when the sol is in the course of being formed into a fiber configuration. As a result, the viscosity of the high-viscosity sol changes with time. The sol used in the present invention has no such a catalyst added thereto and, therefore, exhibits very good storage stability. That is, the high-viscosity sol is almost free from the possibility of change with time and can be kept stable, so that the sol has a long service life during which the sol can be used in fiber spinning. This makes it possible to spin a gel-form fiber from a large quantity of high-viscosity sol over a long time period and under given conditions at the subsequent step. Thus, the process of fiber production is stabilized, resulting in yield improvement and production cost reduction. Another advantage is that since the sol has no acid content, there is no problem of metal part deterioration with respect to the production equipment.

Next, a gel-form fiber is formed from the concentrated high-viscosity sol. One specific method which can be used for this purpose is to form a string of the highly viscous sol into a fiber form as the string of the sol is picked up. Another method which can be used is to extrude a string of high-viscosity sol through a small opening. By employing one of these methods it is possible to form, simultaneously with the picking up of the sol string or the extrusion, a gel-form fiber from the viscous sol in a room-temperature atmosphere. Further, in order to facilitate the handleability of gel-form fiber, such as fiber take-up, it is desirable that the gel-form fiber is subjected to drying.

At the second step, organic matter in the gel-form fiber is decomposed and removed. Specifically, the gel-form fiber is heat treated in a water vapor atmosphere so that organic matter in the gel-form fiber is decomposed to remove any gas component which may otherwise be a cause of voids. Heat treatment is carried out preferably at a temperature lower than the temperature at which crystal or amorphous growth begins to occur, but higher than room temperature. For example, in the case of PLZT, a temperature of not more than 800° C. is preferred so that the lead content can be prevented from becoming volatilized to cause a change in the composition of the PLZT. Alternatively, heating may be carried out initially at room temperature with gradual temperature rise to a temperature at which crystal or amorphous growth begins to occur.

When heat treatment is carried out in a water vapor atmosphere with air and oxygen, and ammonia gas used as a carrier gas, a hydroxyl group (M—OH, where M denotes metal) and a metalloxane bond (M—O—M', where M and M' denote metal) can be effectively formed in the gel-form fiber by hydrolysis and polymerization, with the result that organic substances are liberated so that organic substances in the fiber can be easily decomposed and removed. Where the water vapor atmosphere is in the form of air streams, operation can be made more effective and efficient.

The quantity of organic matter residue in the fiber can be measured, for example, by a spectrum of infrared absorption, and/or differential thermal analysis. Aforesaid heat treatment is carried out until the quantity of acetate present as residual organic matter is reduced to about one half or less, preferably about one third or less, more preferably about one fifth or less, of the quantity of acetate contained in the gel-form fiber prior to the heat treatment.

At the third step, the gel-form fiber obtained at the second step is solidified. At this step, the gel is vitrified and/or crystallized. The term "vitrify" used herein is intended to mean also "to become amorphous" and "to become glass-ceramic"; and the term "crystallize" herein is intended to mean also "polycrystallize" and "to become glass-ceramic". Solidification can be effected by carrying out heat treatment at temperatures higher than a temperature at which vitrification or crystallization occurs as is conventionally practiced. The heat treatment may be carried out in a water vapor atmosphere. More preferably, heat treatment is carried out in an oxygen atmosphere, or in a water-vapor atmosphere with oxygen and/or air used as carrier gas, preferably in a water-vapor current atmosphere. By so doing the diffusion of any gas component in voids produced within the fiber can be prompted. Simultaneously with the diffusion and removal of the gas component the fiber can be densified through heat diffusion.

FIG. 1 is a view showing a schematic construction of a gel-form fiber forming apparatus (hereinafter referred to as "fiber forming apparatus A". The fiber forming apparatus A. Briefly, the fiber forming apparatus A comprises a high-viscosity sol vessel 51, a heater unit 52 for drying a gel-form fiber drawn from the high-viscosity sol, and a winder 53 for winding up a dried fiber.

In use of the fiber forming apparatus A, first a stream of high-viscosity sol is picked up out of the high-viscosity sol in the vessel 51 by means of a sharp-pointed pin or the like, and is passed through the heater, being then wound on the winder 53. The winder 53 is driven by a motor not shown to rotate at a constant speed so that successive streams of dried sol in a fiber form are sequentially would up.

In the above described step of operation, the fiber, just after it is picked up from the high-viscosity sol, is still in a sol form, but as the fiber is picked up its solvent component is gradually volatilized to allow the fiber to set. The gel-form fiber is dried by the heater unit 52 so that a fiber can be obtained which has sufficient strength such that the fiber will not break when it is wound up.

FIG. 2 is a schematic view showing the construction of a fiber forming apparatus of a form different from the aforesaid fiber forming apparatus A. The fiber forming apparatus B has an opening 61a at the bottom thereof.

The apparatus B comprises a high-viscosity sol vessel 61, a cylinder 62 for pressing the high-viscosity sol, a heater unit 63 for drying a gel-form fiber which is pushed out as such from the opening by being pressed by the cylinder 62, and a winder 64 for winding up the dried fiber.

In operation of the fiber forming apparatus B, the high-viscosity sol is pushed out from the opening 61a by the cylinder 62, and is wound in a fiber form on the winder 64 through the heater. The winder 64 is driven by a motor not shown to rotate at a constant speed so that successive streams of dried sol in fiber form are sequentially wound up.

In the fiber forming apparatuses A and B, by varying the viscosity of the high-viscosity sol, and varying the winding velocity of winder 53 or 63 it is possible to vary the diameter of the fiber to be produced. In order to obtain a fiber of the desired diameter, the viscosity of the high-viscosity sol and the winding velocity of the winder 53 is suitably adjusted.

FIG. 3 is a schematic view showing the construction of an apparatus for heat-treating the would-up gel-form fiber in a water vapor atmosphere (hereinafter referred to as "water-vapor heat treating apparatus C"). Briefly, the water-vapor heat treating apparatus C comprises a water vapor generator 72 and a water-vapor atmosphere heat-treating unit 74. Wound-up gel-form fiber 75 is heated by the water-vapor atmosphere heat-treating unit 74 to a temperature of 100° C. or more. Water vapor 73 is introduced into the water-vapor atmosphere heat-treating unit 74 by introducing carrier gas 71 into hot water, and any unreacted metallic material present in the gel-form fiber 75 is hydrolyzed in a water-vapor atmosphere and partially eliminated. This facilitates complete removal of organic matter at the next step and, in effect, can inhibit generation of voids in the course of heat treatment.

Figure 4:
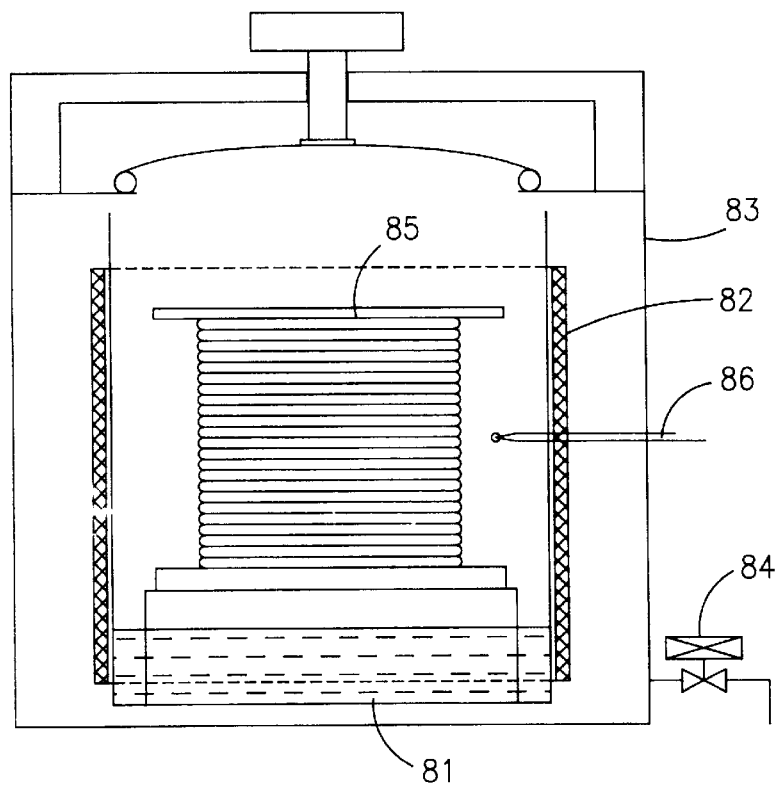
FIG. 4 is a schematic view showing an apparatus for heat-treating a gel-form fiber under pressure in a water-vapor atmosphere.

FIG. 4 is a schematic view showing the construction of an apparatus for heat-treating the would-up gel-form fiber under pressure in a water vapor atmosphere (hereinafter referred to as "pressurizing water-vapor treating apparatus D"). Gel-form fiber 85 placed in the pressurizing water-vapor treating apparatus D may be heat treated in a high-pressure water vapor atmosphere generated by heating water 81 by means of a band heater 82 in a pressure vessel 83. By being pressurized the water vapor is allowed to penetrate into the gel-form fiber to hydrolyze unreacted metallic material more effectively than in the case where no pressure is applied, thus contributing toward removal of the organic matter. In this conjunction, the higher the pressure, the greater is its effect for hydrolysis. When the cost of the equipment and safety aspect are considered, however, a pressure range of the order of 1.5 to 3 kg cm$^{-2}$ is preferred. Referring to the temperature aspect, a temperature range of 80 to 250° C. is preferred for purposes of facilitating hydrolysis and polymerization. If the temperature is too low, the progress of reaction is slowed down. If the temperature is too high, the organic matter components become carbonized and this results in sudden generation of carbonic acid gas during the next step of heat treatment, leading to the formation of voids which adversely affects the resulting product.

At the second step, when the water vapor has an acid component present therein and is therefore acidic, the water vapor facilitates the hydrolysis of the gel fiber and contributes toward removal of organic matter. Further, when the water vapor contains ammonia and the like and is basic, the water vapor facilitates the polymerization of the gel fiber and contributes toward removal of organic matter. The degrees of acidity and basicity of the water vapor are: in the case where the water vapor is acidic, pH is 2 to 6, preferably 4 to 6, because excessively high acidity leads to the deterioration of the production equipment and requires high cost of wastewater/exhaust gas treatment; and in the case where the water vapor is basic, pH is 8 to 14, preferably 8 to 10, because excessively high basicity requires high cost of wastewater/exhaust gas treatment.

At the second step, by immersing the gel-form fiber in a water-containing solution and heating the same, it is possible to carry out hydrolysis almost completely of the metallic material in the fiber with which partial progress has been made in hydrolysis and polymerization. This facilitates complete removal of organic matter at the next step, thus inhibiting generation of voids during heat treatment. In this way, the second step is intended to carry out hydrolysis almost completely and, therefore, it is desirable that the solution be composed of 100% water; but the solution may be a mixture of water and alcohol. If the cost of waste liquid treatment is not considered, as in the case of aforesaid water vapor treatment, the solution may contain acid and basic components for facilitating hydrolysis and polymerization. Heating at a temperature lower than boiling point of water but as high as practically possible is effective for hydrolysis and removal of organic matter component.

In the second step operation wherein the fiber is immersed in hot water so as to be almost completely hydrolyzed, the intended hydrolysis can be almost completely performed if the quantity of water added to the sol at the preceding step is comparatively large and if polymerization has moderately progressed. However, if the degree of polymerization is insufficient, there may occur a trouble such that the gel fiber is dissolved in the hot water. Preferably, thereof, aforesaid water vapor treatment or pressurized water vapor treatment should be carried out.

By further heating the gel-form fiber in an electric oven at a temperature at which a solid phase metal oxide is separated out (in the case of PLZT, crystal separation occurs at 600° C. or more), it is possible to solidify the fiber. An amorphous state fiber can be produced by heat-treating the gel-form fiber at a temperature lower than the crystallizing temperature. In the case of PLZT, it is possible to produce a fiber having electro-optic characteristics which can be used as an optical shutter.

According to the arrangements of above described fiber forming apparatuses A and B and of the water-vapor heat-treating apparatus C, it is possible to produce fibers having an outer diameter of 5 to 300 μm, with a very small number of voids present therein, by suitably controlling the fiber forming conditions for respective apparatuses. By employing the method above, it is possible to produce polycrystalline metal oxide fibers and amorphous metal oxide fibers, which are formed from metal oxides such as PLZT, PZT, PbTiO$_3$, LiNbO$_3$, and LiTaO$_3$, metal oxides comprised essentially of PLZT, such as PBLZT in which bismuth is substituted for a part of the lead in PLZT, PLLZT in which lithium is substituted for a part of the lead, and a metal oxide in which magnesium and niobium are substituted for a part of zirconium.

A metal oxide fiber produced according to the fiber forming method of the invention has only a small number of very minute voids and can exhibit high light-transmisttance and good electro-optic effect.

The market for ceramics fibers of the present invention is expectable in various applications such as array-form light-modulation devices and actuators.

EXAMPLES

The following Examples are given to further illustrate the present invention.

Example 1

Example 1 is an example in which the method of producing a metal oxide fiber of the present invention was applied to a PLZT fiber.

First Step

First, a solution comprising 2-methoxy ethanol:lead aceto-trihydrate:lanthanum isoproxide:zirconium propoxide:titanium isopropoxide:ethanol:water= 6:1.001:0.09:0.635:0.342:20:2 in molar ratio was prepared according to the following procedure.

Lanthanum isopropoxide was heated and dissolved in 2-methoxy ethanol at 90° C. The solution was allowed to cool, and then lead aceto-trihydrate was added, being heated and dissolved in the solution at 70° C. (solution A).

Separately from solution A, a solution was prepared by sequentially adding titanium isopropoxide and zirconium propoxide to ethanol of a quantity corresponding to one half of the total quantity, all the components being mixed together (solution B).

Solution A was poured into solution B, and the solutions were mixed together. After being refluxed at 78° C. for 2 hours, the mixed solution was allowed to cool down to room temperature. A mixture solvent of the remaining ethanol and water was added dropwise, and the resulting solution was stirred, whereby a homogeneous solution was obtained (solution C).

After having been allowed to stand for 2 hours, the solution C was heated and concentrated at 140° C., a temperature higher than the boiling point of 2-methoxy ethanol, until the solution exhibited a cobwebbing behavior. Thus, the solution C was made into a high-viscosity sol.

A tip-pointed pin was put in the high-viscosity sol and then pulled up. Thereafter, the pulled-up string of sol was spun into fiber by aforesaid fiber forming apparatus A at a take-up speed of 80 cm/sec.

Second Step

The gel-form fiber was held in the water-vapor heat treatment apparatus C, with the temperature kept at 200° C., and water vapor was introduced with air used as a carrier gas. The gel-form fiber was kept as it is for 4 hours, whereby residual organic matter was decomposed and removed. Measurement of the infrared absorption spectrum of the fiber was made, and judging from respective magnitudes of absorption peaks of about 1400 and about 1550 $cm^{-1}$, COO symmetrical and unsymmetrical vibrations of acetate in the infrared absorption spectrum, it was found that the residual organic matter had been decomposed and removed to leave a balance of about one third of the quantity of such organic matter contained in the gel-form fiber prior to the treatment. This tells that hydrolysis and polymerization of organic metal material in the gel-form fiber had been prompted.

Third Step

The fiber obtained at the second step was heat treated at 1000° C. in a hydrogen atmosphere for 30 minutes, whereby crystallization was effected.

The fiber obtained had a diametrical size of 30 μm. An X-ray diffraction measurement made with respect to the fiber after heat treatment tells that the crystal phase was a perovskite phase and the fiber was a PLZT fiber. An electron microscopic observation of fiber rupture surface witnessed that any voids having a diameter of about 0.01 μm or more which might adversely affect light transmission due to light scattering were not present in the fiber.

Example 2

Example 2 is an example in which the present invention was applied to PZT fiber.

First Step

First, a solution comprising 2-methoxy ethanol:lead aceto-trihydrate:zirconium propoxide:titanium isopropoxide:ethanol:water=6:1.001:0.5:0.5:20:2 in molar ratio was prepared according to the following procedure.

Lead aceto-trihydrate was added to 2-methoxy ethanol, and the mixture was heated and dissolved at 70° C. (solution D).

Separately from solution D, a solution was prepared by sequentially adding titanium ixopropoxide and zirconium propoxide to ethanol of a quantity corresponding to one half of the total quantity in molar ratio. (solution E).

Solution D was poured into solution E for mixture therewith, and the mixed solution was refluxed at 78° C. for 2 hours. Then, the mixed solution was allowed to cool down to room temperature.

A mixture solvent of the remaining ethanol and water was added dropwise, and the resulting solution was stirred, whereby a homogeneous solution was obtained (solution F).

After having been allowed to stand for 2 hours, the solution F was heated and concentrated at 160° C., a temperature higher than the boiling point of 2-methoxy ethanol, until the solution exhibited a spinnable behavior. The solution F was thus made into a high-viscosity sol.

A tip-pointed pin was put in the high-viscosity sol and then pulled up. Thereafter, the pulled-up string of sol was spun into fiber by the earlier described fiber forming apparatus A at a take-up speed of 80 cm/sec. At this point of time, the fiber had a diameter of about 30 μm.

Second Step

The gel-form fiber was heat-treated in the water vapor heat treatment apparatus C wherein water vapor was used with ammonia gas as a carrier gas at a heating rate of 0.5° C./min, from room temperature and up to 480° C., and was further heat treated at 480° C. for 15 minutes. Thus, organic matter in the gel-form fiber was decomposed. A measurement of the infrared absorption spectrum of the fiber was made, and from magnitudes of absorption peaks of about 1400 and about 1550 $cm^{-1}$, COO symmetrical and unsymmetrical vibrations of acetate in the infrared absorption spectrum, it was found that the organic matter had been decomposed. Further, an X-ray diffraction measurement witnessed that the fiber was amorphous.

Third Step

The fiber, after organic matter decomposition, was heat treated at 800° C. for 30 minutes in a water vapor atmosphere with oxygen used as a carrier gas, whereby crystallization was effected.

An X-ray diffraction measurement made with respect to the fiber after heat treatment witnessed that the crystal phase was a tetragonal perovskite phase and the fiber was a PZT fiber. An electron microscopic observation of fiber rupture surface witnessed that any voids having a diameter of 0.05 μm or more which might lead to a dielectric constant drop and/or piezoelectric effect drop were not present in the fiber.

Example 3

Example 3 is an example in which the method of the present invention was applied to $LiNbO_3$ fiber.

First Step

First, a solution comprising 2-methoxy ethanol:mettalic lithium:niobium ethoxide:ethanol:water=70:1:1:20:0.8 in molar ratio was prepared.

Metallic lithium was dissolved in 2-methoxy ethanol in a dry nitrogen atmosphere, and then niobium oxide was added. The resulting solution was refluxed at 105° C. for 10 hours. Then, a mixed solvent of ethanol and water was added dropwise, followed by stirring, whereby a homogeneous solution was obtained.

The solution, 2 hours after it was prepared, was concentrated by heating at 150° C. The concentrated solution exhibited a cobwebbing behavior. A tip-pointed pin was put in the solution, and fiber spinning was carried out at a take-up speed of 80 cm/sec in the same way as in Example 1. As a result, a gel-form fiber having a diameter of 50 μm was obtained.

Second Step

The gel-form fiber was heat-treated in the water vapor heat treatment apparatus C, wherein water vapor was used with oxygen as a carrier gas, at 200° C. for 8 hours, whereby organic matter was hydrolyzed.

Third Step

The fiber, after organic matter therein was hydrolyzed, was heat treated in a water vapor atmosphere with oxygen used as a carrier gas at a heating rate of 0.5° C./min, from 100° C. and up to 480° C., and was further heat treated at 500° C. for 60 minutes, whereby crystallization was effected.

An X-ray diffraction measurement made with respect to the fiber after heat treatment witnessed that the crystal phase was an ilmenite type crystalline structure and that the fiber was an $LiNbO_3$ fiber.

An electron microscopic observation of fiber rupture surface witnessed that any voids having a diameter of 0.05 $\mu m$ or more which might lead to a dielectric constant drop and/or piezoelectric effect drop were not present in the fiber.

Example 4

Example 4, like Example 1, is an example in which the method of the invention was applied to a PLZT fiber.

First Step

A gel-form fiber was produced in the same way as in the first step of Example 1.

Second Step

PLZT fiber was water-vapor treated at 130° C., under the pressure of 1.7 $kg/cm^2$, in a pressurized water-vapor treatment apparatus D for 2 hours. The PLZT gel fiber was immersed in hot water, heated to 95° C., for 5 hours. The fiber was then dried at 110° C., whereby an amorphous fiber was obtained which was almost free from organic matter residue.

Third Step

The amorphous fiber was heat-treated at 700° C. in an electric oven for 5 minutes in a water vapor atmosphere with oxygen used as a carrier gas. As a result, a crack-free, homogeneous fiber of a dense structure was obtained. A sectional electron microscopic observation witnessed that voids having a diameter of 0.01 $\mu m$ or more which might adversely affect light transmission due to light scattering were not present in the fiber. An X-ray ray diffraction measurement witnessed that the crystal phase of the fiber was a perovskite phase and that the fiber was a PLZT fiber. The fiber had a diameter of 30 $\mu m$.

By spinning a gel-form fiber from a high-viscosity sol prepared by the sol/gel process, and by subjecting the fiber to heat treatment including water-vapor treatment, it is possible to produce a ceramics fiber which is substantially free from voids which may lead to degradation in optical characteristics.

What is claimed is:

1. A method of producing a metal oxide fiber comprising:
    forming a gel-form fiber from a sol obtained by concentrating a solution comprising a metallic compound, water and a solvent to the extent that the solution exhibits a spinnable behavior;
    decomposing and eliminating organic components out of the gel-form fiber to obtain a decomposed gel-form fiber; and
    solidifying the decomposed gel-form fiber;
    wherein said decomposing and eliminating organic components out of the gel-form fiber comprises heating the gel-form fiber in a water vapor atmosphere having a pressure of more than one atmosphere.

2. The method of claim 1, wherein said solidifying the decomposed gel-form fiber further comprises heating the decomposed gel-form fiber in a water vapor atmosphere comprising a gas selected from the group consisting of oxygen, ammonia and air.

3. The method of any one of claims 1 to 2, wherein said solidifying the decomposed gel-form fiber forms an amorphous, polycrystalline or glass ceramic fiber.

4. The method of any one of claims 1 to 3, wherein the metal oxide comprises a material expressed by a formula $ABO_3$,
    wherein A denotes a member selected from the group consisting of Li, Na, La, Gd, Ca, Sr, Ba, Pb, Bi, Y, Ce, Pr, Nd, Sm, Eu, Tb, Dy, Ho, Cd, and a mixture thereof; and B denotes a member selected from the group consisting of Sn, Ti, Zr, Hf, V, Nb, Mg, Ta, W, Mo, Mn, Sb, Cr, Ni, Fe, Zn, Sc, Si, Ge, Te, Al, Co, and a mixture thereof.

5. The method of claim 1, wherein the water vapor atmosphere is acidic or basic.

6. The method of claim 1, wherein said decomposing and eliminating organic components out of the gel-form fiber further comprises immersing the gel-form fiber in a water-containing solution and heating the gel-form fiber in the water-containing solution,
    said water vapor atmosphere comprising a gas selected from the group consisting of oxygen, air and ammonia.

7. The method of claim 1, wherein said decomposing and eliminating organic components out of the gel-form fiber further comprises immersing the gel-form fiber in a water-containing solution and heating the gel-form fiber in the water-containing solution.

8. The method of claim 1, wherein the water vapor atmosphere is under a pressure of 1.5 go to 3 $kg/cm^2$.

9. A metal oxide fiber comprising a material expressed by a formula $ABO_3$,
    wherein A denotes a member selected from the group consisting of Li, Na, La, Gd, Ca, Sr, Ba, Pb, Bi, Y, Ce, Pr, Nd, Sm, Eu, Tb, Dy, Ho, Cd, and a mixture thereof; and B denotes a member selected from the group consisting of Sn, Ti, Zr, Hf, V, Nb, Mg, Ta, W, Mo, Mn, Sb, Cr, Ni, Fe, Zn, Sc, Si, Ge, Te, Al, Co, and a mixture thereof;
    further wherein said fiber does not contain voids having a diameter of about 0.01 $\mu m$ or more.

10. The metal oxide fiber of claim 9, said fiber being produced by a process comprising:
    forming a gel-form fiber from a sol obtained by concentrating a solution comprising a metallic compound, water and a solvent to the extent that the solution exhibits a spinnable behavior;
    decomposing and eliminating organic components out of the gel-form fiber to obtain a decomposed gel-form fiber; and
    solidifying the decomposed gel-form fiber;
    wherein said decomposing and eliminating organic components out of the gel-form fiber comprises heating the gel-form fiber in a water vapor atmosphere having a pressure of more than one atmosphere.

11. The metal oxide fiber as set forth in claim 10, wherein said solidifying the decomposed gel-form fiber further comprises heating the decomposed gel-form fiber in a water vapor atmosphere, said water vapor atmosphere comprising a gas selected from the group consisting of oxygen, ammonia and air.

12. The metal oxide fiber as set forth in claim 10, wherein the solidifying of the gel-form fiber forms an amorphous, polycrystalline or glass ceramic fiber.

13. The metal oxide fiber as set forth in claim 10, wherein said decomposing and eliminating organic components out of the gel-form fiber further comprises a further heat treatment of the gel-form fiber in water, said water vapor atmosphere comprising a gas selected from the group consisting of oxygen, air and ammonia.

14. The metal oxide fiber as set forth in claim 10, wherein said decomposing and eliminating organic components out of the gel-form fiber further comprises immersing the gel-form fiber in a water-containing solution and heating the gel-form fiber in the water-containing solution, said water vapor atmosphere comprising a gas selected from the group consisting of oxygen, air and ammonia.

15. The metal oxide fiber as set forth in claim 10, wherein said decomposing and eliminating organic components out of the gel-form fiber further comprises immersing the gel-form fiber in a water-containing solution and heating the gel-form fiber in the water-containing solution.

16. The metal oxide fiber as set forth in claim 10, wherein the water vapor atmosphere is under a pressure of 1.5 go 3 $kg/cm^2$.

\* \* \* \* \*